(12) United States Patent
Krebs et al.

(10) Patent No.: US 10,508,649 B2
(45) Date of Patent: Dec. 17, 2019

(54) MOTOR/PUMP UNIT HAVING A SINGLE ELASTIC DIAPHRAGM

(71) Applicant: Continental Teves AG & Co. oHG, Frankfurt (DE)

(72) Inventors: Stephan Krebs, Eschborn (DE); Michael Jürging, Kelkheim (DE); Manfred Rüffer, Sulzbach (DE); Heinrich Kreh, Florstadt (DE); Jens Bacher, Frankfurt am Main (DE); Ricardo Toquero, Frankfurt am Main (DE); Jose Gonzalez, Bad Oeynhausen (DE); Marcel Niepenberg, Meinhard-Hitzelrode (DE); Lazar Milisic, Kelkheim/Taunus (DE); Falk Petzold, Frankfurt am Main (DE); Hans-Michael Koppel, Frankfurt (DE); Paul Wiebe, Weiterstadt (DE); Martina Breitkopf, Eschborn (DE); Thomas Oeffner, Karben (DE); Adrian Messner, Darmstadt (DE); Ulrike Meyer, Frankfurt (DE); Stefan Imhof, Oberursel (DE); Rolf Fellinger, P.Rayong (TH)

(73) Assignee: Continental Teves AG & Co. oHG, Frankfurt (DE)

( * ) Notice: Subject to any disclaimer, the term of this patent is extended or adjusted under 35 U.S.C. 154(b) by 190 days.

(21) Appl. No.: 15/554,088

(22) PCT Filed: Mar. 15, 2016

(86) PCT No.: PCT/EP2016/055556
§ 371 (c)(1),
(2) Date: Aug. 28, 2017

(87) PCT Pub. No.: WO2016/150763
PCT Pub. Date: Sep. 29, 2016

(65) Prior Publication Data
US 2018/0073500 A1    Mar. 15, 2018

(30) Foreign Application Priority Data
Mar. 20, 2015   (DE) .......................... 10 2015 205 059

(51) Int. Cl.
*F04B 53/00*   (2006.01)
*F04B 45/047*   (2006.01)
(Continued)

(52) U.S. Cl.
CPC .......... *F04B 53/003* (2013.01); *B60T 13/569* (2013.01); *B60T 17/02* (2013.01);
(Continued)

(58) Field of Classification Search
CPC .... F04B 53/001; F04B 53/003; F04B 39/005; F04B 39/0061; F04B 39/0055;
(Continued)

(56) References Cited

U.S. PATENT DOCUMENTS 5,017,100 A * 5/1991 Arkans ................... F04B 43/04
137/903
5,782,621 A * 7/1998 Harris ..................... F04B 37/14
417/470
(Continued)

FOREIGN PATENT DOCUMENTS

DE    4118652 A1    8/1992
DE    29919188 U1   1/2000
(Continued)

OTHER PUBLICATIONS

Korean Office Action for Korean Application No. 10-2017-7025210, dated Sep. 27, 2018, with translation—10 pages.
(Continued)

*Primary Examiner* — Philip E Stimpert
(74) *Attorney, Agent, or Firm* — RatnerPrestia

(57) ABSTRACT

A simple, compact, and economical motor/pump unit for supplying vacuum to a pneumatic brake booster of a motor-vehicle brake system, wherein the motor/pump unit is designed as a diaphragm pump having a single elastomeric diaphragm, which is moved by an electrically operated motor unit by an eccentric drive, and has a pump housing and a working-space cover and the diaphragm is clamped between the pump housing and the working-space cover at the radial outer edge of the diaphragm in a sealing manner and the working-space cover is designed as a multi-part working-space cover having an upper cover, a lower cover, and an inlet valve and an outlet valve, which are arranged between the upper cover and the lower cover and control the air circulation through the working space.

10 Claims, 5 Drawing Sheets

(51) Int. Cl.
| | | |
|---|---|---|
| *F04B 11/00* | (2006.01) | |
| *F04B 53/10* | (2006.01) | |
| *F04B 53/20* | (2006.01) | |
| *F04B 53/16* | (2006.01) | |
| *B60T 13/569* | (2006.01) | |
| *B60T 17/02* | (2006.01) | |

(52) U.S. Cl.
CPC ............ *F04B 11/00* (2013.01); *F04B 45/047* (2013.01); *F04B 53/1072* (2013.01); *F04B 53/20* (2013.01); *F04B 53/16* (2013.01)

(58) Field of Classification Search
CPC ...... F04B 39/121; F04B 39/125; F04B 39/16; F04B 45/047; F04B 43/1072; F04B 39/0027; F04B 39/0033; F04B 39/0038; F04B 43/02; F04B 11/00; F04B 11/0091
USPC .......................................................... 417/312
See application file for complete search history.

(56) References Cited

U.S. PATENT DOCUMENTS

| | | |
|---|---|---|
| 8,714,941 B2 | 5/2014 | Ruffer et al. |
| 2011/0277464 A1* | 11/2011 | Ruffer ................... B60T 17/02 60/533 |
| 2013/0034459 A1* | 2/2013 | Mueller ................ F04B 17/046 417/559 |
| 2015/0030476 A1 | 1/2015 | Krebs et al. |

FOREIGN PATENT DOCUMENTS

| | | |
|---|---|---|
| DE | 19912926 A1 | 9/2000 |
| DE | 102009054499 A1 | 7/2010 |
| DE | 102013201718 A1 | 8/2013 |
| JP | 2002371968 A | 12/2002 |
| WO | 0057058 A1 | 9/2000 |
| WO | 2007134928 A1 | 11/2007 |
| WO | 2014053039 A1 | 4/2014 |

OTHER PUBLICATIONS

International Search Report and Written Opinion for International Application No. PCT/EP2016/055556, dated Jun. 17, 2016, 7 pages.
German Search Report for German Application No. 10 2015 205 059.9, dated Feb. 12, 2016, including partial English translation, 8 pages.

* cited by examiner

MOTOR/PUMP UNIT HAVING A SINGLE ELASTIC DIAPHRAGM

CROSS REFERENCE TO RELATED APPLICATIONS

This application is the U.S. National Phase Application of PCT International Application No. PCT/EP2016/055556 filed Mar. 15, 2016, which claims priority to German Patent Application No. 10 2015 205 059.9, filed Mar. 20, 2015, the contents of such applications being incorporated by reference herein.

FIELD OF THE INVENTION

The invention relates to a motor/pump unit, in particular for supplying reduced pressure to a pneumatic brake booster for a hydraulic passenger vehicle brake system. Modern vehicle drives in most cases provide too little reduced pressure, or none at all, in order to be able to operate a pneumatic brake booster. This makes it necessary to use separate pump units in order to produce the required reduced pressure.

BACKGROUND OF THE INVENTION

In this case, motor/pump units having a separate drive unit have been found to be particularly flexible to use since they can be operated as required independently of the main drive. In this instance, vane pumps and dual diaphragm pumps with two opposing elastomer diaphragms in a horizontally opposed arrangement are particularly widespread. The dual diaphragm pumps particularly have compared with vane pumps advantages that they function in a reliable manner even at high temperatures and at great heights at low air pressure, and further have a steep air flow start-up characteristic. However, they are also in most cases constructed in a heavier, larger, more complex manner and are consequently more expensive than vane pumps. In addition, such constructions often require complex devices in order to protect against water being introduced into the inner space in order to prevent damage to the motor/pump unit and the brake booster.

SUMMARY OF THE INVENTION

Therefore, an aspect of the present invention provides a motor/pump unit which, whilst retaining the advantages of dual diaphragm pumps, is simpler, more compact and more cost-effective.

The construction according to an aspect of the invention of a highly integrated unit with an individual diaphragm enables the use of a smaller and lighter electric drive, the reduction of individual components, a considerable reduction of costs, weight and assembly complexity. More compact outer dimensions enable a more packaging in the engine space of a motor vehicle.

A pneumatic connection for connecting the operating space of the motor/pump unit to the consumer, such as, for example, brake booster, may in a particularly advantageous manner be arranged directly at the operating space cover in the direct vicinity of the inlet valve and in particular be formed on. Additional air channels which reduce the degree of efficiency are omitted and the construction of the pump housing is considerably simplified. In addition, the pneumatic connection can be adapted in a flexible manner in accordance with the spatial requirements present, both in terms of the direction and position and type—for example, as a connection piece, a bayonet closure, a rapid-fit closure or a quick connector.

A sound-damping unit which is arranged directly on the operating space cover directly after the outlet valve and which is preferably formed on so as to be integrated and which has a porous filter element enables particularly efficient noise reduction with little pressure loss and a high degree of efficiency.

In an advantageous development of the invention, there may be provided in the sound-damping unit in order to prevent the penetration of water a non-return valve which is arranged in the air flow direction between the filter element and the atmosphere and which is configured in such a manner that it is closed in the direction of the filter element. In this instance, the non-return valve may be produced in a cost-effective manner from an elastomer material and be clamped so as to be able to be assembled in a particularly simple manner between the filter element and the wall with the air outlet opening in the sound-damping unit.

A damp filter element in most cases results in a considerably increased pressure loss. As a result of the use of a non-return valve, it would be possible to use for the filter element cost-effective and particularly effective sound-damping materials without any consideration for the absorbency thereof and water-resistant coatings could be dispensed with.

In a particularly advantageous development, the non-return valve may be constructed as a lip valve, in particular as a duckbill valve. Such a valve construction is more aerodynamic and quieter than a comparable flat valve, provides a significantly better protective effect against the penetration of water, is at the same time more cost-effective, lighter and has a smaller spatial requirement than mechanical resiliently loaded non-return valves with a barrier member.

In another advantageous development, the air flow which is discharged from the filter element and where applicable from the non-return valve may be directed into a channel in which it is first redirected and is only then directed into the environment. In this instance, the channel forms an additional protection device against the penetration of water, contamination and mechanical damage by forming a type of baffle in front of the air outlet opening; additionally, as a result of the redirection of the air flow, the sound-damping action is further increased.

In this instance, the channel may have only one, but also two and more, outlet opening(s) which can be arranged at different angles with respect to each other. It is thereby possible to deliberately select a direction for the outlet opening which is particularly protected from spray water.

In other developments, the electrical connector plug may, in order to supply electrical power to the motor unit, be provided directly on the motor unit or integrated in the pump housing. The integration of the connector plug in the pump housing with at the same time configuration of the electrical contacting with respect to the motor unit has been found to be particularly advantageous so that it is brought about independently and necessarily when the pump housing and the motor unit are combined during the assembly of the motor/pump unit—for example, by means of corresponding plug type or resilient contacts which are arranged at defined positions in the two components. The assembly is thereby considerably simplified, process steps reduced and assembly errors—for example, as a result of forgotten contacting or damaged cables—are prevented.

Other details, features, advantages and application possibilities of the invention will be appreciated from the dependent claims together with the description and with reference to the Figures. Corresponding components and structural elements are given the same reference numerals where possible.

A detailed description of basic functions of a generic motor/pump unit is in this instance substantially omitted since it is sufficiently well known.

DETAILED DESCRIPTION OF THE PREFERRED EMBODIMENTS

Figure 1:
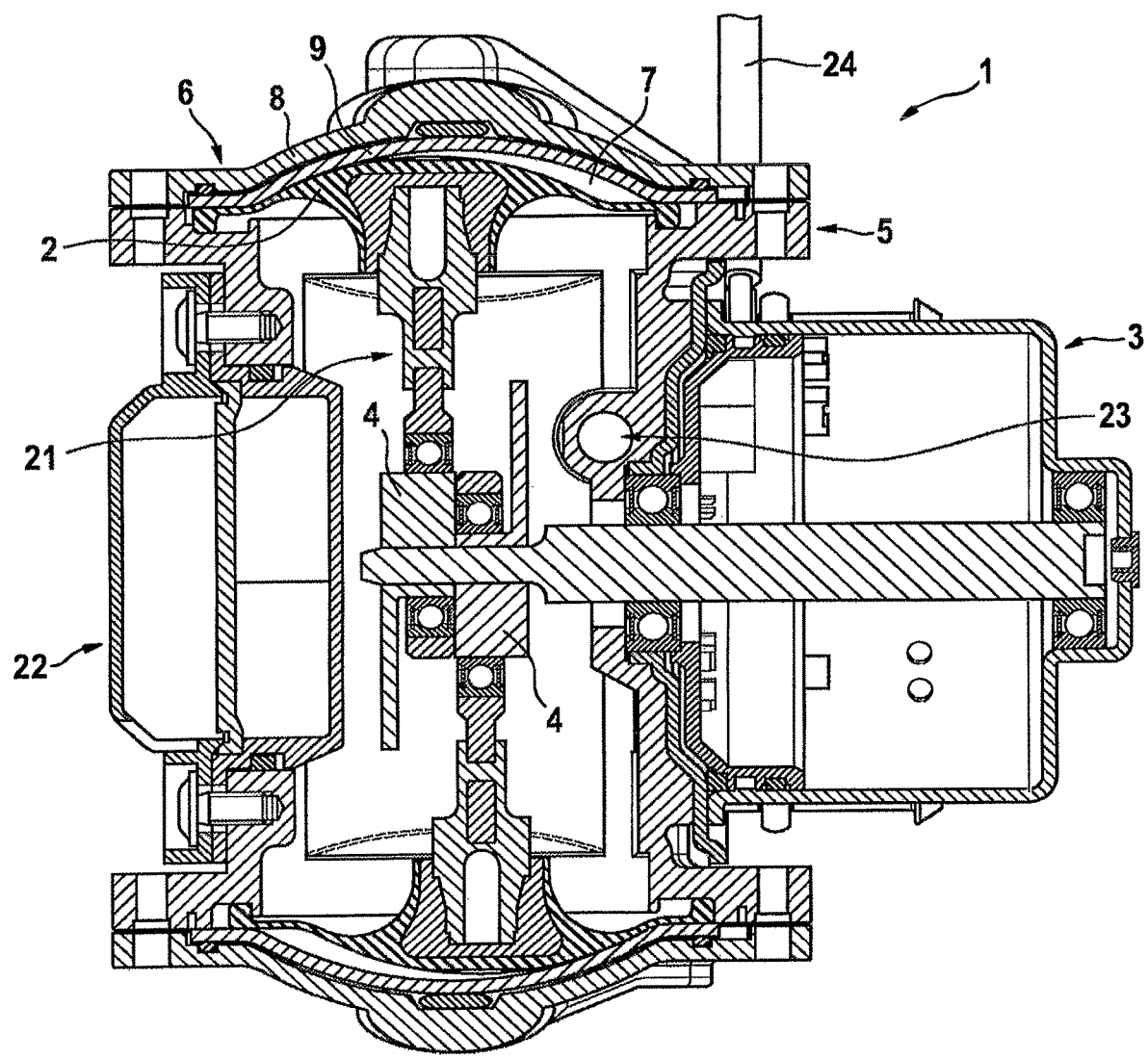
FIG. 1 shows a known embodiment of a dual diaphragm pump.

FIG. 1:

FIG. 1 shows a known embodiment of a motor/pump unit 1 which is constructed as a dual diaphragm pump. A motor unit 3 drives via an eccentric drive 4 two connecting rods 21 which transmit the movement to two diaphragms 2 which are arranged in opposition. The pump housing 5 is closed at both sides by an operating space cover 6 in each case. An elastomer diaphragm 2 is clamped between each operating space cover 6 and the pump housing 5 in an air-tight manner so that in each case between the diaphragm 2 and the operating space cover 6 an operating space 7 is constructed with a variable volume. Each operating space cover 6 is constructed in several parts with an upper cover 8 and a lower cover 9 and an inlet valve 10 and an outlet valve 11 which are arranged between the upper cover 8 and the lower cover 9 and which are not shown and which control the air circulation through the operating space 7. The air to the inlet valves is supplied via a central air connection 23 which is arranged on the pump housing 5 via air channels which are not illustrated and which are integrated in the pump housing 5. The air from the outlet valves is directed via additional channels into the inner space from the pump housing 5 and from there through the air outlet unit 22 which is arranged on the pump housing 5 into the atmosphere. Via a cable line 24 which is guided out of the motor unit 3, the electric drive is supplied with electric current and controlled.

Figure 2:
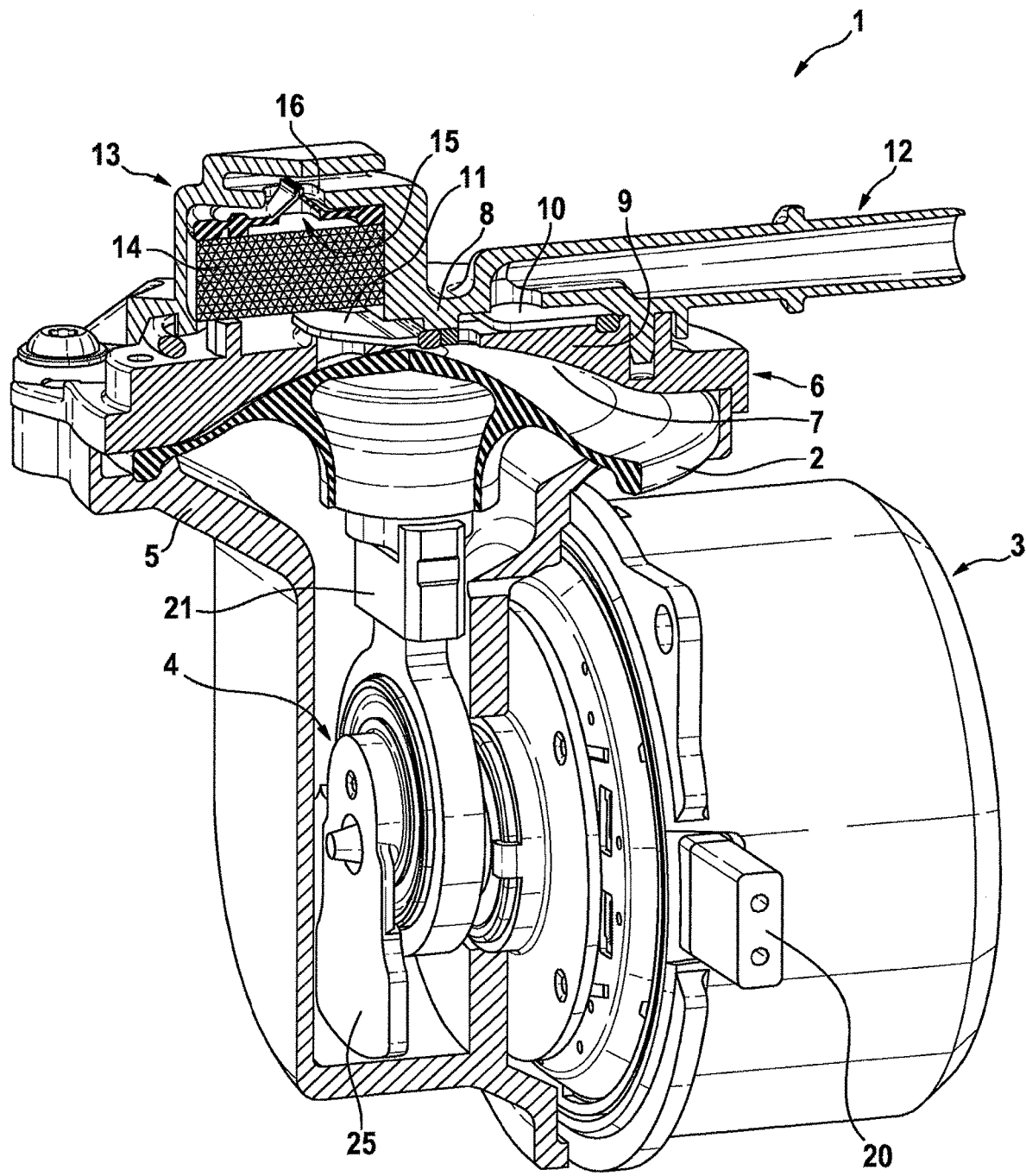
FIG. 2 shows a first embodiment according to an aspect of the invention of the motor/pump unit with a partially cut-away portion.

FIG. 2:

FIG. 2 shows a first embodiment of the motor/pump unit 1 according to an aspect of the invention. The motor/pump unit 1 has in contrast to the known embodiment according to FIG. 1 only a single diaphragm 2. This is caused to move by a single connecting rod 21 which is driven by means of the electric motor unit 3 via the eccentric drive 4 with a single cam. A compensation weight 25 which is formed on the cam serves to balance the mass with respect to the connecting rod 21 and thus ensures a reduction of vibrations during operation.

The pump housing 5 is combined at one side with the motor unit 3 and screwed thereto and, at another upper side in the drawing, it is closed by means of an operating space cover 6. Between the operating space cover 6 and the pump housing 5, the diaphragm 2 is clamped in a sealing manner at the radially outer edge thereof. In this instance, a bead on the diaphragm edge is pressed into a peripheral circular groove in the pump housing 5.

The operating space cover 6 is constructed in several parts and has an upper cover 8 and a lower cover 9. There are arranged between the upper cover 8 and the lower cover 9 an inlet valve 10 and an outlet valve 11 which are both constructed as resilient plate valves.

A pneumatic connection 12 for connection, for example, of a brake booster, and a sound-damping unit 13 is arranged on the upper cover 8. In the embodiment shown, the spatial structures required for this are configured as integrative components of the upper cover 8.

Figure 3:
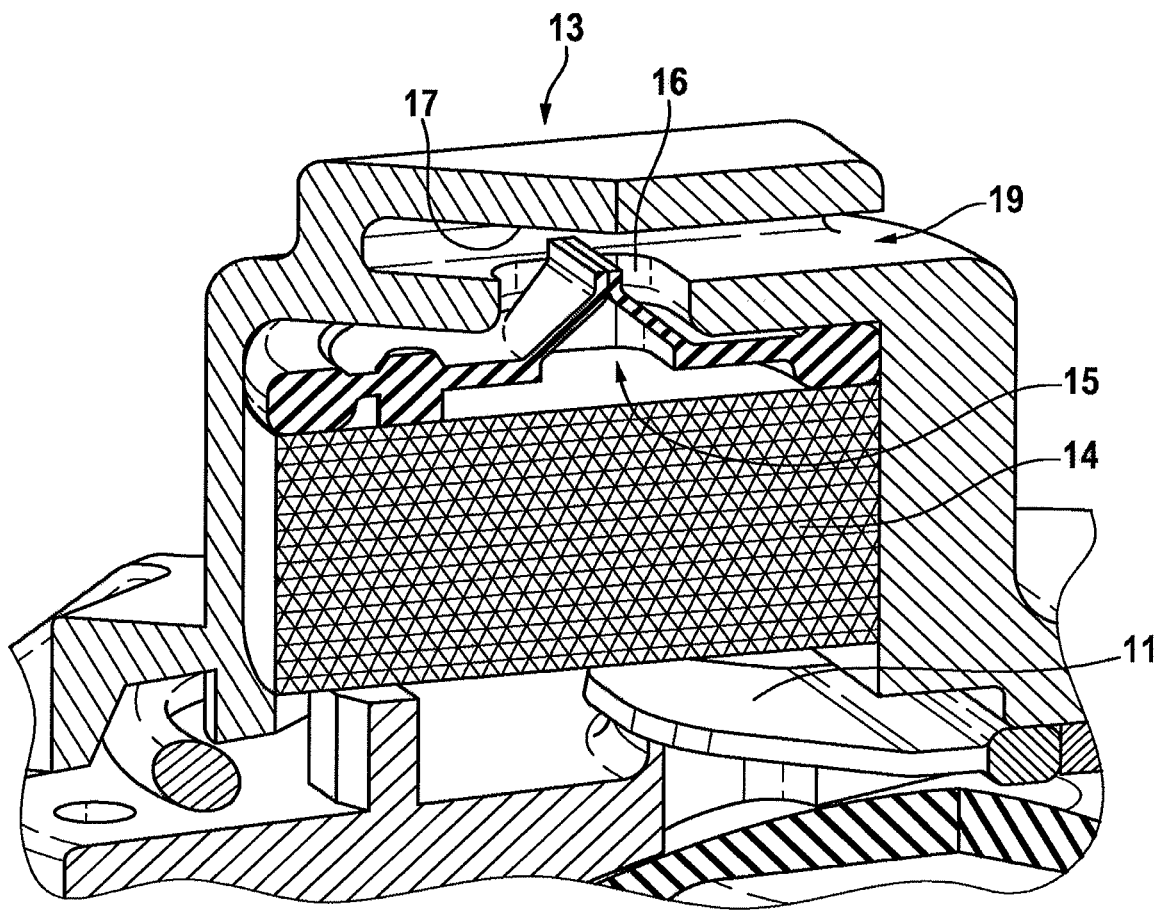
FIG. 3 is an enlarged view of the sound-damping unit of the embodiment according to FIG. 2.

FIG. 3:

FIG. 3 is an enlarged view of the sound-damping unit from FIG. 2. The sound-damping unit 13 performs substantially two functions. Firstly, it serves to reduce noise in the air flow discharged from the operating chamber 7. To this end, it has a filter element 14 of a porous material, wherein the filter element 14 takes up substantially the entire inner space of the sound-damping unit 13.

Secondly, the sound-damping unit 13 prevents water penetration from the environment of the motor/pump unit 1. To this end, there is provided in the sound-damping unit 13 a non-return valve 15 which is arranged as a direction-dependent barrier between the filter element 14 and the environment—the atmosphere. In order to discharge the air, the sound-damping element 13 has in a wall an air discharge opening 16; in this instance, the non-return valve 15 is clamped between the filter element 14 and the wall with the air outlet opening 16. The non-return valve is constructed from an elastomer material and has a lip valve which is formed as a so-called duckbill valve. When the air is discharged from the operating chamber 7 during travel of the diaphragm 2, the lips of the valve open in a resiliently pretensioning manner as a result of the higher air pressure at the filter side and close as a result of the pretensioning which has built up as soon as the air pressure at both sides of the valve has been balanced again.

Figure 4:
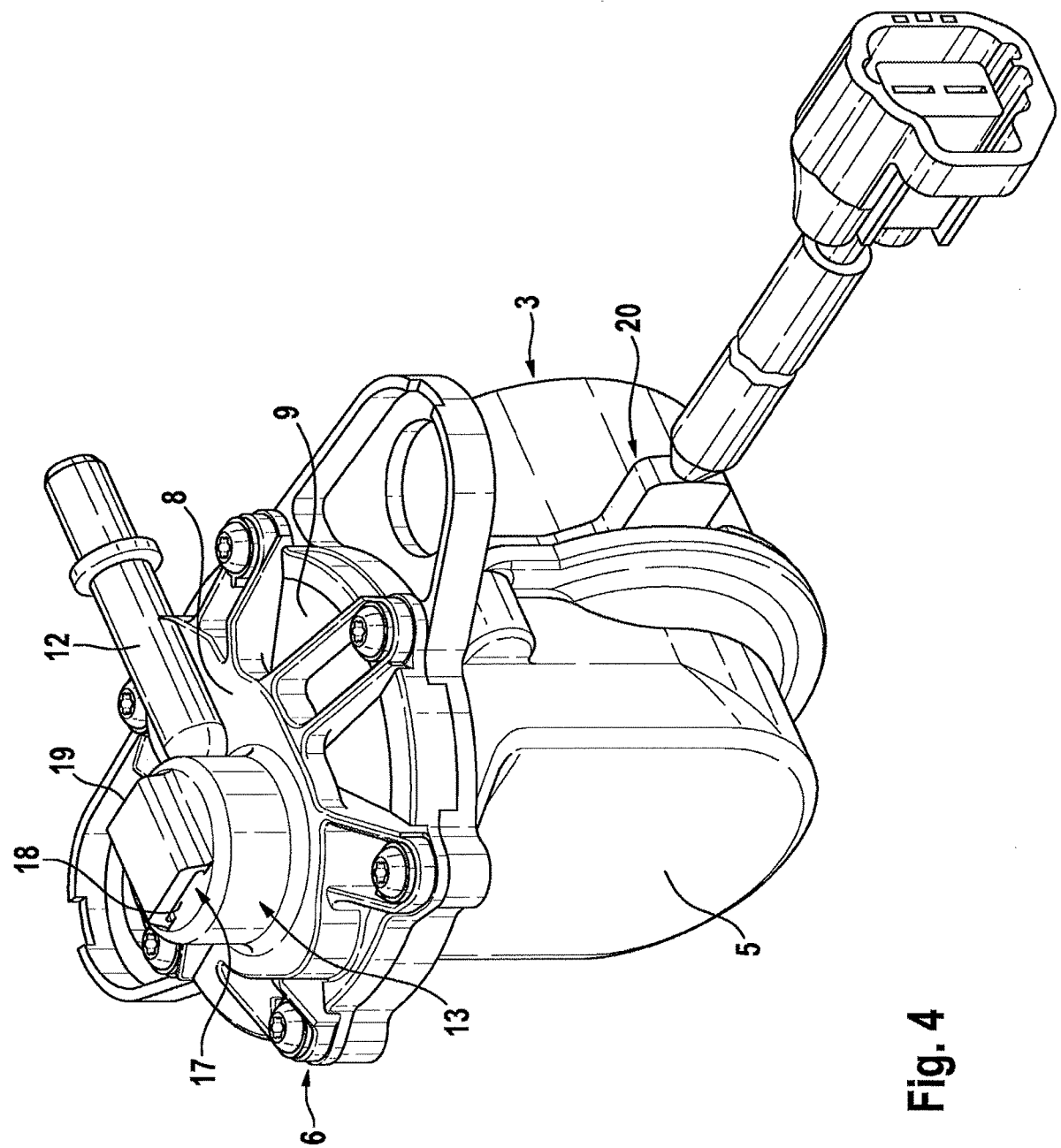
FIG. 4 is a three-dimensional view of a motor/pump unit according to an aspect of the invention.

The air which is discharged from the air outlet opening 16 of the sound-damping unit 13 enters a channel 17, where it is redirected and is finally discharged from the motor/pump unit 1 into the environment through two opposing outlet openings 18, 19 (see FIG. 4). The channel 17 improves both the noise reduction in addition to redirecting the air flow, and the water protection by acting as a baffle in front of the air outlet opening 16.

In the embodiment illustrated, the channel 17 has a flattened, substantially rectangular cross-section and is formed by means of a hood which is open at both sides and which is formed on the sound-damping unit 13. Within the scope of the invention, however, the channel 17 may be configured with any cross-section and extent, may have only one or more than two outlet openings 18, 19 which in addition are arranged not exclusively in opposition, but instead at an angle different from 180° with respect to each other.

FIG. 4:

In FIG. 4, the above-described embodiment of the motor/pump unit 1 according to an aspect of the invention is illustrated for clarity as a three-dimensional illustration. There can be seen the electrical connector plug 20 which is for supplying the motor unit 3 with electrical power and where applicable control signals and which is arranged directly on the motor unit 3. The connector plug 20 forms an interface for the electrical on-board network of the vehicle.

Figure 5:
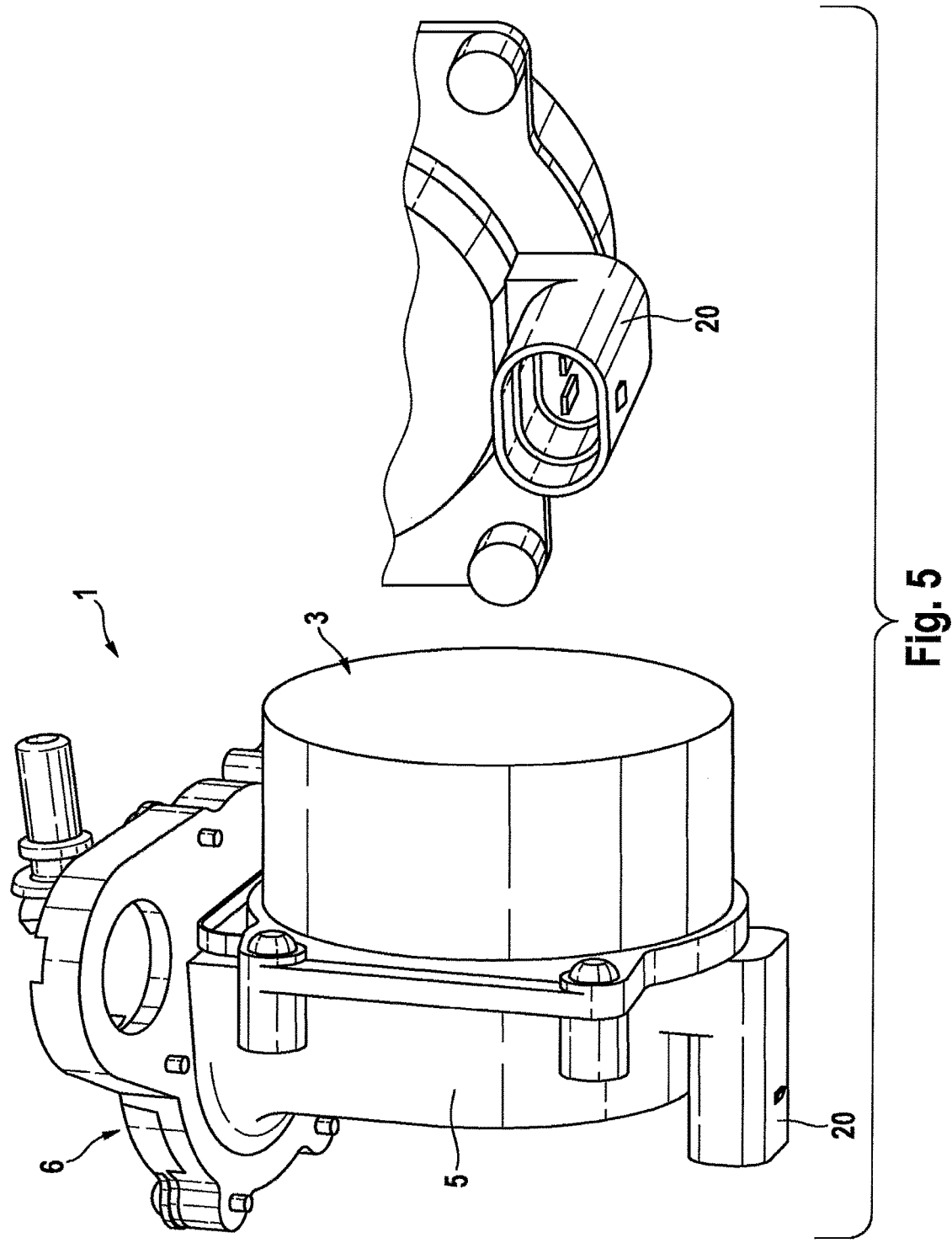
FIG. 5 is a three-dimensional view of another embodiment of a motor/pump unit according to an aspect of the invention and an enlarged view of the associated connector plug.

FIG. 5:

In the additional embodiment according to an aspect of the invention illustrated in FIG. 5, the connector plug 20 is integrated in the pump housing 5. In this instance, the contacting (not shown) between the connector plug 20 and the motor unit 3 inside the pump housing 5 may be configured in such a manner that it is brought about independently and necessarily when the motor unit 3 is combined with the pump housing 5 during the assembly of the motor/pump unit 1—for example, by means of corresponding plug type or resilient contacts which are arranged at defined positions in the two components.

LIST OF REFERENCE SYMBOLS

1 Motor/pump unit
2 Diaphragm
3 Motor unit
4 Eccentric drive
5 Pump housing
6 Operating space cover
7 Operating space
8 Upper cover
9 Lower cover
10 Inlet valve
11 Outlet valve
12 Connection
13 Sound-damping unit
14 Filter element
15 Non-return valve
16 Air outlet opening
17 Channel
18 Outlet opening
19 Outlet opening
20 Connector plug
21 Connecting rod
22 Air outlet unit
23 Air connection
24 Electric cable
25 Compensation weight

The invention claimed is:

1. A motor/pump unit for supplying pressure to a pneumatic brake booster, wherein:
the motor/pump unit is constructed as a diaphragm pump having a single elastomer diaphragm, and
the diaphragm is moved by an electrically operated motor unit by an eccentric drive,
the motor/pump unit comprising a pump housing and an operating space cover and the diaphragm is clamped at a radial outer edge thereof between the pump housing and the operating space cover in a sealing manner so that between the diaphragm and the operating space cover an operating space with a variable volume is constructed,
the operating space cover is constructed in several parts with an upper cover and a lower cover and an inlet valve and outlet valve which are arranged between the upper cover and the lower cover and which control the air circulation through the operating space,
wherein a sound-damping unit for the noise-reducing discharge of the air from the operating space into the atmosphere is provided, the sound-damping unit arranged on the operating space cover, the sound-damping unit having a filter element of a porous material and a non-return valve, the non-return valve arranged in the air flow direction between the filter element and the atmosphere, the non-return valve clamped in the sound-damping unit between the filter element and a wall with an air outlet opening.

2. The motor/pump unit as claimed in claim 1, wherein a pneumatic connection for introducing the air into the operating space is provided, wherein the connection is arranged on the operating space cover.

3. The motor/pump unit as claimed in claim 2, wherein the connection and the sound-damping unit are connected integrally to the operating space cover.

4. The motor/pump unit as claimed in claim 1, wherein the non-return valve is constructed from an elastomer material as a lip valve.

5. The motor/pump unit as claimed in claim 1, wherein an electrical connector plug for supplying electrical power to the motor unit is provided so as to be integrated in the pump housing.

6. The motor/pump unit as claimed in claim 5, wherein electrical contact between the connector plug and the motor unit is produced when the pump housing and the motor unit are combined.

7. The motor/pump unit as claimed in claim 1, wherein an electrical connector plug for supplying electrical power to the motor unit is arranged on the motor unit.

8. The motor/pump unit as claimed in claim 1, wherein the non-return valve is constructed from an elastomer material as a duckbill valve.

9. A motor/pump unit for supplying pressure to a pneumatic brake booster, wherein:
the motor/pump unit is constructed as a diaphragm pump having a single elastomer diaphragm, and
the diaphragm is moved by an electrically operated motor unit by an eccentric drive,
the motor/pump unit comprising a pump housing and an operating space cover and the diaphragm is clamped at a radial outer edge thereof between the pump housing and the operating space cover in a sealing manner so that between the diaphragm and the operating space cover an operating space with a variable volume is constructed,
the operating space cover is constructed in several parts with an upper cover and a lower cover and an inlet valve and outlet valve which are arranged between the upper cover and the lower cover and which control the air circulation through the operating space,
wherein a sound-damping unit for the noise-reducing discharge of the air from the operating space into the atmosphere is provided, the sound-damping unit arranged on the operating space cover, the sound-damping unit having a filter element of a porous material and a non-return valve, the non-return valve arranged in the air flow direction between the filter element and the atmosphere, and wherein a channel for redirecting an air flow which is discharged from the non-return valve is provided.

10. The motor/pump unit as claimed in claim 9, wherein the channel is constructed for redirecting the air flow in at least two different directions by having differently orientated outlet openings.

* * * * *